UNITED STATES PATENT OFFICE 2,335,521

CATALYST FOR DRYING OIL POLYMERIZATION

Edward A. Lasher, Los Angeles, Calif., assignor to California Flaxseed Products Company, Los Angeles, Calif., a corporation of California No Drawing. Application January 30, 1943, Serial No. 474,225

12 Claims. (Cl. 260—407)

This invention relates to the polymerization of drying oils and particularly to the catalyst used in the process.

Fatty oils used in the protective coating fluids such as vegetable and fish oils of the drying or semi-drying types are polymerized or "heat-bodied" by heating them to high temperatures for many hours, thus increasing the viscosity to any desired point up to a solid or gelled condition. The polymerized oils are commonly called "heat-bodied" oils.

Long heating of fatty oils tends to darken them and to increase the acidity. It is therefore desirable to increase the rate of polymerization in order to shorten the time of heating, not only to avoid darkening and acid increase, but to increase the amount of "heat-bodied" oil which may be produced from available equipment.

One object of the present invention is to accelerate this polymerization or heat-bodying process so that it may be accomplished in shorter time, thereby lessening the discoloration and development of acidity. Another object is to provide a catalyst for this polymerization which does not discolor or otherwise impair the properties of the drying oil. Another object is to provide drying or semi-drying oils having improved bodying properties when heated.

I have discovered that these and other objects may be attained by the use of aryl substituted aliphatic polyketone compounds as catalysts in the heat-bodying of polymerizable fatty oils of the drying or semi-drying types.

These compounds have the general structure

for the aryl-substituted aliphatic poly-α-ketones, and

for the aryl-substituted aliphatic poly-β-ketones; where R and R' are aromatic radicals, $n$ is an integer of two or more, and $m$ and $m'$ are integers of one or more. In my preferred polyketone compounds, R and R' are aromatic radicals having no carboxyl, sulfonic, or other acid groups. Among the aryl-substituted aliphatic polyketones which I have found useful as catalysts in the heat-bodying of oils are benzil, dibenzoyl ketone, dibenzoyl methane, diphenyl tetraketone, dinaphthyl diketone, and di(2,3,dimethoxyphenyl) diketone, and the like.

Heat bodied oil of excellent quality is produced by heating the oils in the presence of these catalysts in much less time than is required when no catalyst is employed. Only small amounts of my catalysts are required, the amount being less than one-half percent on the basis of the oil treated, and usually being about one-tenth percent.

The temperature range at which polymerizable oils containing my catalyst may be bodied is substantially the same as that now employed in commercial practice without catalysts, namely from about 500 to 600° F. The use of my catalyst greatly shortens the time required to produce a given degree of bodying or polymerization, as determined by the viscosity, molecular weight or density, being of the order of one-half the time required at the same temperature when no catalyst is employed.

The catalysts of my invention may be dissolved in the oil in the necessary amount to produce the desired heat-bodying effect, and the oils may then be stored and marketed as polymerizable oils, to be heated to effect the polymerization at a later time by the user. Oils when so prepared are characterized by having improved heat-bodying properties due to the content of less than one-half per cent of my catalyst. No deterioration, or other deleterious effects have been observed in the oils containing my catalysts after long storage in the usual containers used in the trade.

Illustrative of my invention, one-tenth of one percent of benzil was dissolved in refined linseed oil. Upon heating this mixture at 570 to 575° F. for four and one-half hours, a viscosity of Z (Gardner-Holdt scale) was attained. Further heating, for eight and one-half hours (total time) gave heat-bodied oil with a viscosity of Z-6. The comparative times for the same linseed oil without catalyst were respectively seven and twelve and three-quarters hours. The drying qualities of the oil after polymerization in the presence of my catalyst were not impaired, and the color and acid number were less with the use of the catalyst than without.

Similar results were attained by the other named specific compounds as catalysts in oil polymerization.

While I have used linseed oil in my illustrative example as typical of the heat-bodying drying oils, other vegetable and fish oils commonly used in the trade as drying oils in place of or along with linseed oil for heat-bodying, may be employed in my process and for my product, and the term "drying oil" used herein and in the claims includes all such commonly used vegetable and fish oils which are polymerizable or capable of being "heat-bodied" by heating.

The amount of catalyst necessary is of the order of one-tenth percent, but this is not critical, and an increase often results in a greater acceleration in polymerization. A reasonable excess is not harmful, but because of the relatively high cost of the catalyst, the actual amount to be used is kept as low as possible to attain the desired reduction of time necessary to produce a given polymerization effect.

While I have described my invention by means of illustrative examples and compositions, I do not wish to be restricted to these, but limit my invention only insofar as required by the state of the prior art and the spirit of the appended claims.

I claim:

1. A composition consisting of a drying oil and a relatively small amount of an aryl-substituted aliphatic polyketone, characterized by its rapid rate of polymerization when heated to polymerizing temperatures.

2. A composition consisting of a drying oil and a relatively small amount of a substituted aliphatic poly-α-ketone of the general formula $$R-(CO)_n-R'$$

in which R and R' are aromatic radicals having no carboxyl, sulfonic or other acid groups, and $n$ is an integer of two or more, characterized by its rapid rate of polymerization when heated to polymerizing temperatures.

3. A composition consisting of a drying oil and a relatively small amount of a substituted aliphatic poly-α-ketone of the general formula $$R-(CO)_m(CH_2)(CO)_{m'}-R'$$

in which R and R' are aromatic radicals having no carboxyl, sulfonic or other acid groups, and $m$ and $m'$ are integers of one or more, characterized by its rapid rate of polymerization when heated to polymerizing temperatures.

4. A composition consisting of a drying oil and a relatively small amount of benzil, characterized by its rapid rate of polymerization when heated to polymerizing temperatures.

5. A composition consisting of a drying oil and a relatively small amount of di-benzoyl methane, characterized by its rapid rate of polymerization when heated to polymerizing temperatures.

6. A composition consisting of a drying oil and a relatively small amount of di-(2,3,methoxy-phenyl) di-ketone, characterized by its rapid rate of polymerization when heated to polymerizing temperatures.

7. The process of heat-bodying drying oils comprising adding an aryl-substituted aliphatic poly-ketone in an amount not greater than about 5 parts to 1000 parts by weight of drying oil, heating the mixture until the desired thickening has been attained, and then cooling the resulting oil.

8. The process of heat-bodying drying oils comprising adding a substituted aliphatic poly-α-ketone having the general formula $$R-(CO)_n-R'$$

in which R and R' are aromatic radicals having no carboxyl, sulfonic or other acid groups, and $n$ is an integer of two or more, in an amount not greater than about 5 parts to 1000 parts by weight of drying oil, heating the mixture until the desired thickening has been attained, and then cooling the resulting oil.

9. The process of heat-bodying drying oils comprising adding a substituted aliphatic poly-β-ketone having the general formula $$R-(CO)_m(CH_2)(CO)_{m'}-R'$$

in which R and R' are aromatic radicals having no carboxyl, sulfonic or other acid groups, and $m$ and $m'$ are integers of one or more, in an amount not greater than about 5 parts to 1000 parts by weight of drying oil, heating the mixture until the desired thickening has been attained, and then cooling the resulting oil.

10. The process of heat-bodying drying oils comprising adding benzil in an amount not greater than about 5 parts to 1000 parts by weight of drying oil, heating the mixture until the desired thickening has been attained, and then cooling the resulting oil.

11. The process of heat-bodying drying oils comprising adding di-benzoyl methane in an amount not greater than about 5 parts to 1000 parts by weight of drying oil, heating the mixture until the desired thickening has been attained, and then cooling the resulting oil.

12. The process of heat-bodying drying oils comprising adding di-(2,3,methoxy phenyl) di-ketone in an amount not greater than about 5 parts to 1000 parts by weight of drying oil, heating the mixture until the desired thickening has been attained, and then cooling the resulting oil.

EDWARD A. LASHER.